United States Patent
Kidambi et al.

(10) Patent No.: US 6,424,626 B1
(45) Date of Patent: Jul. 23, 2002

(54) METHOD AND SYSTEM FOR DISCARDING AND REGENERATING ACKNOWLEDGMENT PACKETS IN ADSL COMMUNICATIONS

(75) Inventors: Kalyan R. Kidambi, Ashburn, VA (US); Shivkumar Kalyanaraman, Albany; Dibyendu Shekhar, Troy, both of NY (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/429,035

(22) Filed: Oct. 29, 1999

(51) Int. Cl.⁷ .......................... G06F 13/00; G06F 15/16

(52) U.S. Cl. ...................... 370/236; 370/410

(58) Field of Search .................. 370/235, 236, 370/248, 249, 252, 253, 389, 390, 391, 400, 401, 410, 465, 478, 493, 496, 498, 522; 714/746, 748, 749; 709/232, 230, 235, 249, 250, 253, 246, 234, 237

(56) References Cited

U.S. PATENT DOCUMENTS

| | | | | |
|---|---|---|---|---|
| 5,517,502 A | * | 5/1996 | Bestler et al. | 370/449 |
| 5,784,597 A | * | 7/1998 | Chiu et al. | 370/252 |
| 5,793,768 A | | 8/1998 | Keshav | 370/400 |
| 5,805,818 A | * | 9/1998 | Perlman et al. | 709/224 |
| 5,961,605 A | * | 10/1999 | Deng et al. | 709/234 |
| 6,272,550 B1 | * | 8/2001 | Deng et al. | 709/232 |

FOREIGN PATENT DOCUMENTS

| | | |
|---|---|---|
| EP | 0 836 300 A2 | 4/1998 |
| WO | WO 00/54451 | 9/2000 |
| WO | WO 01/31833 A1 | 5/2001 |

OTHER PUBLICATIONS

XP–00087555880, Hari Balakrishnan, Venkata N. Padmanabhan and Randy H. Katz, The effects of asymmetry on TCP performance; Mobile Networks and Applications 4 (1999), pp. 219–240.

T.V.Lakshman, et al., "Window–based Error Recovery and Flow Control with a Slow Acknowledgement Channel: a Study of TCP/IP Performance", Proceedings of INFOCOM '97, Apr. 1997.

Hari Balakrishman, et al., "The Effects of Asymmetry on TCP Performance," ACM Mobile Networks and Applications (MONET) Journal.

* cited by examiner

*Primary Examiner*—Ricky Ngo
(74) *Attorney, Agent, or Firm*—Nath & Associates PLLC; Harold L. Novick (57) ABSTRACT

A method and system for discarding and regenerating transmission control protocol (TCP) acknowledgment packets (ACKS) transmitted over an asymmetrical digital subscriber line (ADSL) to increase the data transmission rate. When an incoming ACK is received at a first intermediate node located at one end of the ADSL link, the intermediate node determines whether a prior ACK from the same connection/flow (TCP receiver) is presently stored in a queue awaiting transmission. If a prior ACK packet is not presently stored in the queue, the incoming ACK packet is stored in the queue. However, if there is a prior ACK packet in the queue, the information contained in the incoming ACK packet is stored in a per-connection state table and the incoming ACK packet is discarded. When the prior ACK packet is ready to be transmitted to a second intermediate node via the ADSL link, the information contained in the per-connection state table regarding the discarded incoming ACK is copied into the prior ACK. Upon receiving the prior ACK, the second intermediate node regenerates the discarded ACK based on the information contained in the prior ACK.

15 Claims, 4 Drawing Sheets

| IP HEADER | TCP HEADER | | | | | | | | | |
|---|---|---|---|---|---|---|---|---|---|---|

| SOURCE PORT NUMBER | DESTINATION PORT NUMBER | | | | | | | |
|---|---|---|---|---|---|---|---|---|
| SEQUENCE NUMBER | | | | | | | | |
| ACKNOWLEDGMENT NUMBER | | | | | | | | |
| HEADER LENGTH | RESERVED | URG | ACK | PSH | RST | SYN | FIN | WINDOW SIZE |
| TCP CHECKSUM | URGENT POINTER | | | | | | | |

FIG.4

| SESSION ID | SOURCE IP ADDRESS | SOURCE PORT NUMBER | DESTINATION IP ADDRESS | DESTINATION PORT NUMBER | ACK NUMBER | ACTIVE BIT |
|---|---|---|---|---|---|---|
| 1 | | | | | | |
| 2 | | | | | | |

FIG.5

METHOD AND SYSTEM FOR DISCARDING AND REGENERATING ACKNOWLEDGMENT PACKETS IN ADSL COMMUNICATIONS

FIELD OF THE INVENTION

The present invention relates to a method and system for transmitting data packets over an asymmetrical digital subscriber line. More particularly, the present invention relates to a method and system for discarding and regenerating transmission control protocol (TCP) acknowledgment packets transmitted over an asymmetrical digital subscriber line (ADSL) to increase the data transmission rate.

BACKGROUND OF THE INVENTION

Digital subscriber line (DSL) technology was developed for use as a transmission medium for the Integrated Services Digital Network (ISDN) basic rate access channel. Asymmetric DSL (ADSL) offers a variety of Internet access speeds over a single twisted pair. Therefore, ADSL holds the highest potential in the DSL family to offer inexpensive, broadband access to homes and offices in the near term. Presently, the primary application for ADSL is Internet traffic employing TCP. A very high percentage of Internet traffic is TCP because it is robust in wide variety of environments.

ADSL provides significant increases in bandwidth over existing copper lines using the traditional duplex POTS channels, occupying the frequency band between 300 Hz and 4 KHz. ADSL provides a forward transmission channel of 1.5–8 Mbps, occupying the frequency band of 100 KHz–500 KHz, and a reverse transmission channel of 64–786 Kbps, occupying the frequency band of 10 KHz to 50 KHz. ADSL has bandwidth asymmetry rather than latency asymmetry since the propagation delay is quite negligible. An ADSL line is for exclusive use of the subscriber, with no contention for bandwidth on the local loop.

The asymmetric nature of ADSL adversely affects the performance of TCP because TCP throughput is regulated and limited by the flow of acknowledgments (referred to as the "ACK clock") generated by the receiver in response to received data packets. In particular, TCP steady data transmission is dependent upon acknowledgment packets (ACKs) having the same time spacing all the way back to sender. Once the ACKs reach the sender, the data packets are then clocked out with the same spacing. With ADSL, bandwidth asymmetry affects the performance of TCP because it relies on timely feedback from the receiver to make steady progress and fully utilize the available bandwidth in the forward direction. Therefore, any disruption in the feedback process impairs the performance of the forward direction data transfer. Further, a low bandwidth acknowledgement path could significantly slow the growth of the TCP window at the sender side, and make the data transmission speeds independent of the link rate.

As discussed in "Window-based Error Recovery and Flow Control With a Slow Acknowledgement Channel: A Study of TCP/IP Performance", *Proceedings of INFOCOM 1997*, April 1997 by T.V. Lakshman et al. (Lakshman), the impact of asymmetry on TCP/IP performance can be characterized using an index called normalized bandwidth ratio (k) which is the ratio of raw bandwidths on both directions to the ratio of packet sizes in both directions. When k is greater than one, the TCP throughput on the forward channel is restricted to a maximum of (forward channel bandwidth)/k. In other words, if the reverse channel is saturated at k acknowledgements/second without any acknowledgement suppression, the forward channel can send at a rate of k packets per second (if the window is constant), or else it is 2k packets per second (assuming two packets are sent for every ACK). This can be generalized into a model which is called the AMP model and can be used to guide the study of both unidirectional and bi-directional transfers. Other factors like bi-directional traffic (e.g., downloading a web page while sending an email) or protocol overhead (e.g., PPPoE, PPTP, L2TP, ATM, etc.) will increase k and further aggravate the asymmetry problem.

It has been shown in "The Effects of Asymmetry on TCP Performance", *ACM Mobile Networks and Application Journal*, by Balakrishnan et al. (to appear) and in U.S. Pat. No. 5,793,768 (Keshav), that performance can be substantially increased by making two key changes: simply suppressing acknowledgements on the reverse channel (ACK-filtering), and regenerating them after the reverse link has been traversed (ACK-reconstruction). Balakrishnan et al. also apply the same techniques to address types of asymmetry other than bandwidth asymmetry, including asymmetry in delay, loss rates, and so on. These techniques can be classified as "ACK-regulation techniques" since they are very different from mechanisms like Random Early Drop (RED) because the latter are designed to drop packets, not ACKs, and are used to signal congestion to TCP, not to alleviate asymmetry problems.

Balakrishnan et al. disclose an "ACK-filtering" method wherein when a new ACK enters the queue device, the queue is checked for previous ACKs from the same flow. If previous ACKs are located in the queue, some or all of the of the previous acknowledgments are cleared or discarded and the latest acknowledgment is enqueued at the tail of the queue. The goal is partially to free some space in the queue for other data packets and ACKs, and partially to compress the ACK information. There is no per-flow state, or multiple queues, but there is overhead in linearly searching the queue for ACKs. Balakrishnan et al. disclose that in some cases ACK filtering alone provides either insufficient compensation for asymmetry or even degrades performance, necessitating the use of other techniques like ACK congestion control (ACC), which involves TCP modification, and/or ACKs-first (priority) scheduling for compensation. This is because of the delays in sending out ACK information which might interact with timeouts.

Keshav discloses an "ACK-collapsing" method wherein all ACKs are enqueued, but at the transmission opportunity, the ACK received latest in time is sent and all other ACKs in the queue are dropped. Several ways of implementing this idea are possible (e.g., using separate ACK queues, or queueing ACKs in a LIFO manner, or with a single queue, searching the queue for the latest ACK when there is a transmission opportunity for the connection).

Figure 1:
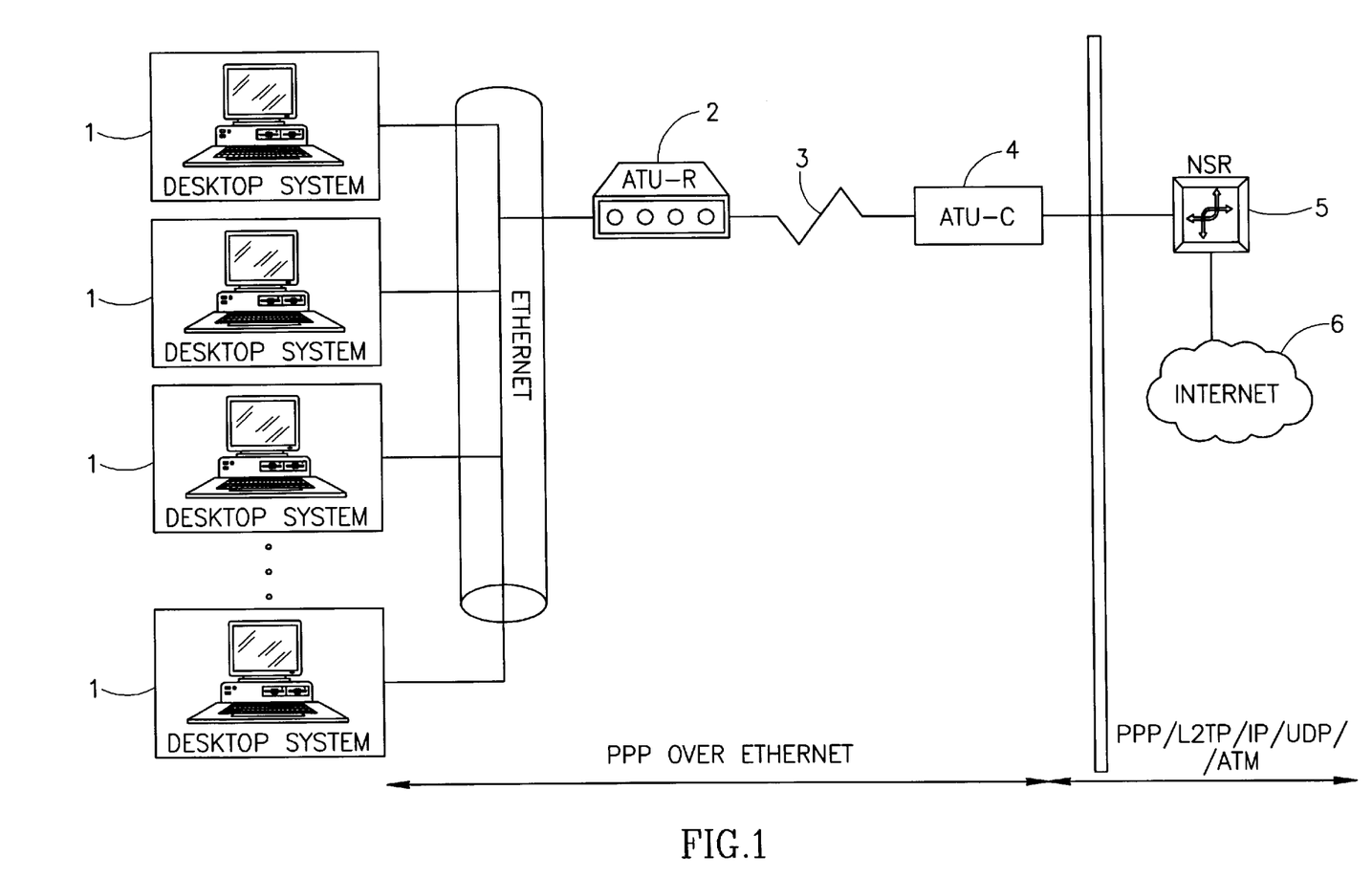
FIG. 1 is a diagram illustrating a conventional TCP network.

FIG. 1 shows a schematic block diagram of a conventional TCP network comprising an ADSL link 3 which is terminated on either end by a remote end ADSL transceiver unit (ATU-R) device 2 located at a customer premises (e.g., a modem) and a central end ADSL transceiver unit (ATU-C) device 4 located at a telephone company central office. The ADSL link 3 has a bandwidth of 8 Mbps in the forward link, and 64 Kbps to 784 Kbps in the reverse link. The ATU-C device 4 functions are assumed to be implemented inside a DSL access multiplexer (DSLAM). Data packets are transmitted from a TCP, data source, such as the Internet 6, using a network device or router 5. The router 5 transmits the data packets to the ATU-C device (DSLAM) 30 over a 155 Mbps link. The ATU-R device 2 is connected to a TCP destination or computer 1 via a 10 Mbps switched Ethernet link. The interface to the computer 1 is often though the point-to-point protocol over Ethernet (PPPoE) standard which allows the leveraging of Ethernet boards which may be pre-installed in computers. Further, multiple computers 1 may be connected through the Ethernet to the ATU-R device 40. In the case of multiple TCP sources (not shown), each source would have a corresponding dedicated 10 Mbps link to the router 5.

Several problems arise due to the constrained reverse link of the ADSL link. An example of this is a user downloading data from a server. To facilitate understanding of the problem, the following discussion is restricted to single source transfer with reference to Table 1 illustrating unidirectional single flow simulation. When the queue buffer size is infinite, the forward throughput is restricted to less then 75% of the full throughput. Further, it can be seen that the effect of asymmetry decreases when the reverse link bandwidth is increased. TCP enters into the congestion avoidance stage in the time limit of 0 to 7 seconds. Moreover, TCP after some time of simulation a point of saturation where the number of data packets generated in response to a single ACK is only two.

TABLE 1

| Forward/Reverse Speeds | Throughput (Mbps) | Average Queue | Simulation Time (seconds) | K |
|---|---|---|---|---|
| 8 Mbps/64 Kbps | 2.51 | 0.03 | 6 | 5 |
| 8 Mbps/128 Kbps | 3.85 | 0.03 | 6 | 2.5 |
| 8 Mbps/64 Kbps | 1.52 | 0 | 20 | 5 |
| 8 Mbps/128 Kbps | 3.01 | 0 | 20 | 2.5 |
| 8 Mbps/256 Kbps | 5.98 | 0 | 20 | 1.25 |
| 8 Mbps/640 Kbps | 7.46 | 0 | 20 | 0.5 |
| 8 Mbps/784 Kbps | 7.46 | 0.8 | 20 | 0.41 |

Therefore, it is an object of the present invention to solve the problem of forward throughput degradation associated with ADSL reverse link saturation.

SUMMARY OF THE INVENTION

In accordance with the present invention, a communication method and system are provided for a TCP network having an ADSL link wherein acknowledgment packets (ACKs) are dropped at one end of an ADSL reverse link and are regenerated at the other end of the ADSL reverse link to increase throughput on both the ADSL forward and reverse links. In particular, when an incoming ACK is received at an ATU-R device located at one end of the ADSL link, the ATU-R device determines whether a prior ACK from the same connection/flow (TCP receiver) is presently stored in a queue awaiting transmission. If a prior ACK packet is not presently stored in the queue, then the incoming ACK packet is stored in the queue for transmission to an ATU-C device located on the other end of the ADSL link. However, if there is a prior ACK packet in the queue, then the information contained in the incoming ACK packet (the ACK packet that is generated latest in time) is stored in a per-flow state table at the ATU-R device and the incoming ACK packet is discarded. When the prior ACK packet is ready to be transmitted to the ATU-C device via the ADSL link, the information contained in the per-connection state table regarding the discarded incoming ACK is copied into the prior ACK so that the prior ACK acknowledges all of the data which the discarded ACK should acknowledge.

Upon receiving the prior ACK, the ATU-C device may regenerate the discarded ACK based on the information contained in the prior ACK such as the number of discarded ACK packets and a connection identifier encoded in a special field within the ACK. The ATU-C device also maintains a per-connection state table which contains information regarding the latest ACK sequence number belonging to each connection. Further, a regeneration factor is introduced which denotes the number of discarded ACKs regenerated in response to one ACK.

The preferred embodiment of the present invention has as its object the suppression of as many ACKs in the reverse channel as possible. In this manner, the preferred embodiment of the present invention takes advantage of the fact that TCP ACKs are cumulative and ensures an acknowledgment packet of a connection in the queue of the ATU-R device. An ACK which leaves the queue acknowledges all the data which the latest ACK coming into queue should acknowledge. Further, per-connection information is maintained so that it guarantees one ACK per-connection to be sent back to the ATU-C device. As a result, a buffer size of only N ACKs is required where N is the number of active flows, assuming separate packet buffers.

BRIEF DESCRIPTION OF THE DRAWINGS

A preferred embodiment of the present invention is described in detail below with reference to the attached drawing figures, in which.

DETAILED DESCRIPTION OF THE PREFERRED EMBODIMENT

Forward throughput for one-way transfer using TCP follows the "AMP" model where A is the ACK transmission rate, M is the multiplication factor (packets generated for each ACK received) and P is the ACK packet size. That is, the fraction of the reverse link allocated to ACK traffic is saturated at A ACKs/second, each ACK generates M packets on the average (M=multiplicative factor), due to the effects of TCP dynamics and ACK-regulation schemes working together, and the average size of packets is P bits/packet. If the forward link capacity allocated to packets corresponding to these ACKs is F bits/second, then the forward link throughput over the observation period is limited to Min (F, $A*M*P$) bits/second. Since the ACK rate A is fixed, the only variables are M and packet size P.

As discussed earlier, Lakshman's normalized bandwidth ratio "k" characterizes an absolute upper bound on the forward throughput based upon link bandwidths and packet vs. ACK sizes. The AMP expression, on the other hand, is an operational bound achievable with the asymmetric channel augmented with ACK-regulation schemes. In particular, if the ACK-regulation components can achieve a maximum average multiplicative factor of M, then the AMP expression is a tighter bound on the achievable forward throughput.

Moreover, it also accounts for scheduling allocations to ACKs and corresponding packets and vice versa (in the definition of F and A), and can hence be useful in understanding effects of bi-directional traffic.

For example, assuming that the reverse link speed is 64 kbps, the forward link speed is 8 Mbps (the forward link is fully allocated to carry packet traffic, and the reverse link to carry ACK traffic), packet size is 1000 bytes, ACK size =40 bytes, TCP is in its slow start phase (generating two packets per ACK) and no ACK-regulation schemes are used. The ACK rate (A) would be 200 ACKs/second, the multiplicative factor M=2, and P 8000 bits, and the maximum throughput limit on the forward link=Min (8 Mbps, 3.2 Mbps)=3.2 Mbps. It should be noted that the number of TCP flows sharing the ADSL link is immaterial in this model because it should be captured in the specification of M. In particular, in this case if the TCP sources are all in congestion avoidance (and not in slow start), then M is closer to 1, and limit is even lower (about 1.6 Mbps).

The AMP model is also useful in analyzing the bi-directional traffic case, especially when link-sharing schemes like class based queueing (CBQ) are deployed. Specifically, it can be assumed that in each direction, there are two classes (queues) served by CBQ: one for packets and one for ACKs. It is further assumed that packets on the forward link get a fraction f (1>f>0) of the forward link capacity ($C_f$), and on the reverse link get a fraction g (1>g>0) of the reverse link capacity ($C_r$). Link capacities are expressed in bits/second. ACKs, therefore, get fractions 1−f and 1−g of the capacity of the forward and reverse links, respectively. Unused capacity of one class may be used by the other class.

The AMP model can be applied to the system as follows, assuming that $P_{ack}$ is the size of ACKs in bits/ACK and for simplicity, that the reverse channel (both packets and ACKs) is saturated at their respective scheduling shares. The bounds on the maximum rates of packets and ACKs in both directions are given in the following table:

|  | Max Packet Rate (pkts/s) | Max ACK Rate (ACKS/s) |
| --- | --- | --- |
| Reverse Channel | $g*C_r/P$ (saturated) | $(1 − g)*C_r/Pack$ (saturated) |
| Forward Channel | $Min[(1 − g)\ C_r M/Pack, f*C_f/P]$ | $Min[f*C_f/P_{ack}, g*C_r/P]$ |

The reverse ACK rate is therefore $(1-g)* C_r/Pack$ ACKs/s, which can generate a maximum packet rate of $Min[(1-g) C_r M/Pack, f*C_f/P]$ in the forward direction. For the above saturation assumption to hold, it is necessary that the forward packet rate is not saturated, i.e., $(1-g)\ C_r M/Pack <= f*C_f/P$. Given that both M and g can vary on the LHS of the inequality, the fraction f should be set large enough to accommodate the maximum of the product (M* (1−g)). Moreover, the maximum possible ACK rate on the forward channel corresponding to any packet rate on the reverse channel is expected to be small for any asymmetric channel. For example, even if the reverse channel is 640 kbps (k=0.5) and all of it was allocated to packets, the ACK rate on the forward channel is 25.6 kbps, less than 0.33% of an 8 Mbps forward link. Therefore, f (the link fraction allocated to packets on the forward link) should be chosen to be large, and can be as large as 99% for pure TCP/IP bi-directional traffic.

The choice of g, however, is partly a policy issue regarding the minimum bandwidth provided to long flows, and partly a performance issue regarding the under utilization of the forward link capacity. If M could increase dynamically to perfectly compensate for the decrease in ACK rate A due to increase in reverse packet traffic, then the performance issue mentioned above disappears. However, M is limited primarily due to dynamics of TCP, especially congestion avoidance, even if ACK regulation schemes could dynamically adapt to increases in reverse packet traffic. In particular, if the normalized bandwidth ratio k, measured in terms of link shares of ACKs and packets on both directions, increases beyond 10, ACK regulation schemes cannot provide sufficient compensation. Therefore, the choice of g (the link fraction allocated to packets on the reverse link) is a tradeoff between performance and policy considerations.

The preferred embodiment of the present invention seeks to suppress as many ACKs in the reverse channel as possible. In this manner, the preferred embodiment of the present invention ensures an ACK of a connection in the queue of the ATU-R device 2 and takes advantage of the fact that TCP ACKs are cumulative. An ACK packet which leaves the queue acknowledges all the data which the latest ACK packet coming into queue should acknowledge. Further, per-connection information is maintained so that it guarantees one ACK per-connection to be sent back to the other end of the ADSK link.

In the preferred embodiment, when an incoming ACK from the TCP receiver is received at the ATU-R device 2, it is determined whether an ACK from the same connection or destination is presently stored in the queue awaiting transmission. A first-in-first-out (FIFO) queue is utilized for storing ACKs (and optionally packets, as discussed later). Unlike U.S. Pat. No. 5,793,768 (Keshav), the preferred embodiment utilizes a minimal per-flow state to avoid enqueuing ACKs which are going to be dropped anyway. In this manner, a queue size of only N ACKs is required, where N is the number of active flows/connections assuming separate packet buffers.

Figure 2:
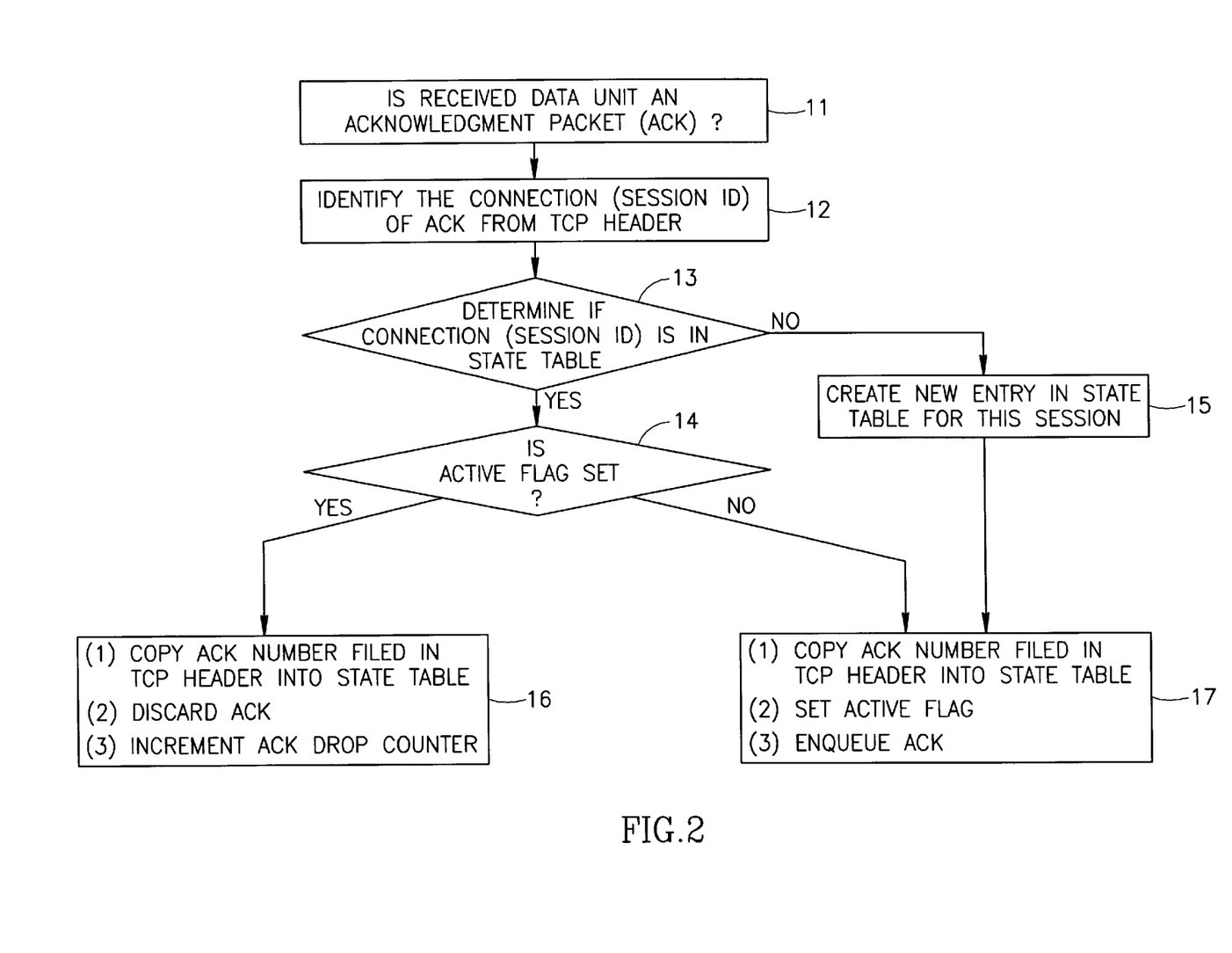
FIG. 2 is a flowchart illustrating an ACK discarding method in accordance with the preferred embodiment of the present invention.
Figure 3:
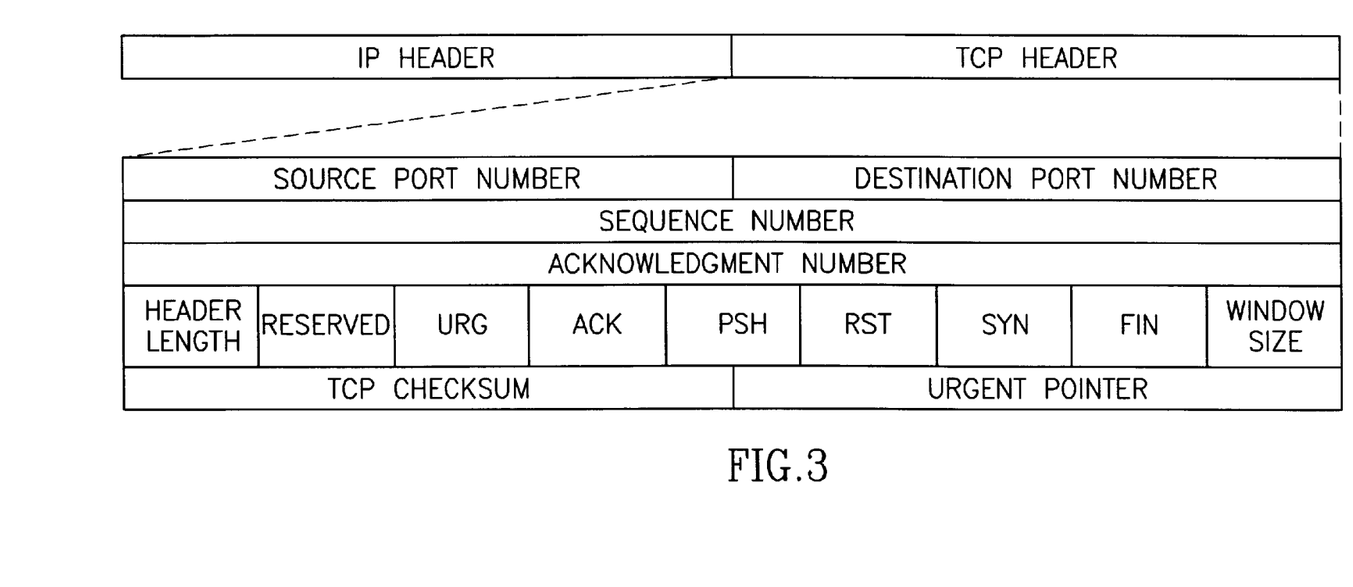
FIG. 3 illustrates the format of an ACK packet and a TCP header.
Figure 4:
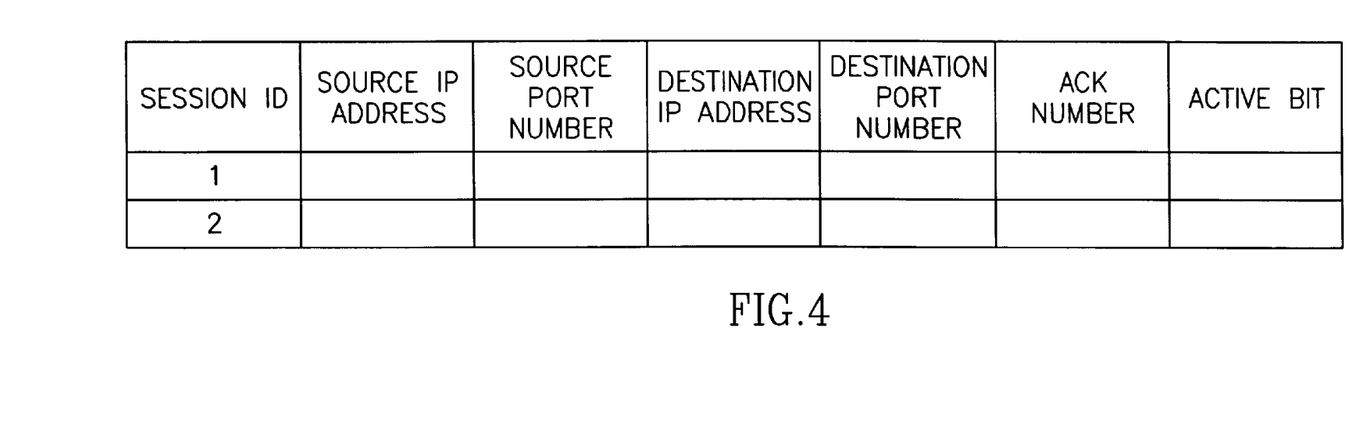
FIG. 4 illustrates the format of a per-connection state table in accordance with the preferred embodiment of the present invention.

In particular, with reference to FIG. 2, when a data unit is received by the ATU-R device 2 from the TCP destination 1, the ATU-R device 2 first must determine whether the data unit is an ACK (step 11). If the incoming data unit is determined to be an ACK, the connection or session ID of the incoming ACK is then identified by checking the source port number, the destination port number, the source address and the destination address in a TCP header of the incoming ACK (step 12). FIG. 3 illustrates the format of an ACK packet and a TCP header. The connection of the incoming ACK as identified by the TCP header is then used to determine if per-flow information regarding the connection of the ACK is stored in a hash or per-connection state table at the CPE device (step 13). As shown in FIG. 4, the per-connection state table includes a flag consisting of a single per-flow or active bit which indicates if an ACK of that flow exists in the queue, and the latest ACK sequence number seen from that flow. If the connection of the incoming ACK is represented in the per-connection state table, the active bit is checked to determine if a prior ACK from the same destination is presently stored in the queue (step 14). If the active bit is zero, the ACK is stored in the queue, the active bit is set to "1" and the ACK sequence number is copied into the per-connection state table (step 17). If the active bit is already set upon receipt of a non-duplicate ACK, then the ACK sequence number in the per-connection state table is updated to this value, the ACK is discarded and an ACK drop counter at the ATU-R device 2 is incremented (step 16). On the other hand, if the connection of the ACK is not represented in the per-connection state table, a new entry is created for the connection of the incoming ACK which includes the source port number, the destination port number, the source address and the destination address from the header of the incoming ACK (step 15). The ACK sequence number is then copied into the per-connection state table, the active bit is set, and the incoming ACK is stored in the queue (step 17).

When an ACK is dequeued for transmission from the ATU-R device 2 to the ATU-C device 4 via the ADSL link 3, the latest value of ACK sequence number from the per-connection state table is copied to the header (header checksum adjusted) of the outgoing ACK and the number of ACKs being dropped as indicated by the ACK drop counter is encoded into the ACK header. Further, the active bit in the per-connection state table is cleared and the ACK drop counter is reset. It should be noted that ACK processing complexity is O(1) since the hash table is searched rather than the FIFO queue.

It is assumed that ACKs are not dropped anywhere else. However, in the case of duplicate ACKs, the exact number of the duplicate ACKs generated is used by TCP in a fast recovery procedure. Therefore, there are two options: either send the same number of duplicate ACKs in the reverse channel, or have a regeneration component which regenerates the correct number of duplicate ACKs. To achieve the former goal, an additional field can be provided in the per-connection state table (which defaults to zero) which counts the number of duplicate ACKs ("dup-ACK count") which have been suppressed. This allows the right number of duplicate ACKs to be transmitted. Specifically, when an opportunity arises, all of the duplicate ACKs thus encoded can be transmitted before dequeueing the next ACK, and as each duplicate ACK is being transmitted, the dup-ACK count in the table can be decremented by one until it reaches zero. Note that this allows the dup-ACK count to increase even as duplicate ACKs are being transmitted. The per-flow bit is set to zero only after transmitting all duplicate ACKs. Alternatively, if the number of duplicate ACKs can be encoded inside some protocol header, then a component on the other side of the link can regenerate the same number of duplicate ACKs without needing them to be explicitly transmitted on the reverse channel.

The AMP model discussed above, in conjunction with a knowledge of TCP dynamics, facilitates an understanding of the advantages of the present invention. If A and P in the AMP model are assumed to be constant, then the ACK dropping method of the preferred embodiment impacts only M in the AMP model, and this effect is also highly dependent upon TCP dynamics.

TCP uses an adaptive window to send packets into the network. If the window remained fixed, or changed very little (as in the TCP congestion avoidance phase), the forward throughput is almost constant at W/RTT, assuming RTT is constant. In this situation, suppose m ACKs (m<W) are suppressed for every ACK transmitted on the reverse channel (assuming every new ACK acknowledges one new segment). The source would receive one ACK for every m packets it transmitted, and transmit m packets for every ACK received. But since the window is fixed, the transmission rate would not exceed W/RTT. Therefore, the impact of the ACK discarding method of the preferred embodiment is to use the reverse channel capacity of A ACKs/s to support a maximum forward rate (as given by the AMP model) of Min[m*A, W/RTT] packets/s. Note, that since TCP increases the window by 1/W per ACK received during congestion avoidance, the window increase during an RTT is 1/m, because the number of ACKs per-RTT has reduced from W to W/m.

When the contending TCP flows are all in the slow start phase, each ACK reaching the TCP source results in (m+1) segments being sent, where m is the number of ACKs suppressed. This is because TCP sends one new packet for every segment acknowledged (m segments are acknowledged in this case) and one additional new packet for increasing the window by one segment. If m is a constant, the instantaneous maximum forward rate (as given by the AMP model) is Min[(m+1)*A, W/RTT] packets/s, where W is also a variable. In reality, m is a random number. Initially, m is small because there are not many ACKs to suppress. Later m can be arbitrarily large depending upon W, and provided the flows remain in slow start. Note that, since TCP increases the window by one segment for every ACK received, the rate of increase of TCP windows is reduced from doubling per RTT (factor of 2) to a factor of (1+W/m) per RTT, because the number of ACKs per RTT has reduced from W to W/m.

Referring back at the AMP model, the multiplicative factor M can be closely approximated as the mean of instantaneous values of (m+1) during slow start, and values of m during congestion avoidance or constant window. In fact, if the TCP sources system remains in slow start phase, the AMP model predicts that the ACK discarding method of the preferred embodiment can compensate for arbitrary degrees of asymmetry (i.e. any finite k). However, since most TCPs reach congestion avoidance within a few RTTs, the multiplicative factor saturates at the value of (near-constant) m seen during the congestion avoidance. In other words, any measurement sample of m (number of ACKs suppressed per ACK transmitted) during congestion avoidance phase will be a good upper bound of M for the entire observation period. This also implies that a higher initial value of SSTHRESH can lead to a higher M because the system saturates at a higher window (and m) value. Alternatively, if SSTHRESH (or socket buffer size) is small, then they have the most dominant effect on performance because M saturates.

Further, the probability of negative interactions with RTT estimation is greatly reduced compared to the ACK-filtering method Balakrishnan et al. for two reasons. First, negative interactions with TCP timeouts occur when there is a possibility of unbounded or large queueing delays compared to the TCP source's current estimate of RTT. Second, the ACK dropping method of the preferred embodiment bounds the maximum queueing delay (time between enqueue and dequeue of any particular ACK) at the controlled queue to be N/A seconds, where N is number of contending flows and A is the ACK transmission rate in units of ACKs/second. There will be a low probability of negative interactions as long as N/A is relatively small compared to the smallest RTT estimate of the source.

Besides the positive effects of reduced ACK buffer size on the reverse link, and increased M in the AMP model, the ACK dropping method of the preferred embodiment also has negative effects, some of which can be compensated for. First, the suppression of ACKs causes a burst of m (or m+1) packets to be sent to the TCPs for every ACK. The variation in m determines the maximum queue size on the forward direction. However, a reasonable buffer size can compensate for this and is recommended to avoid interactions due to packet losses. Secondly, the rate of increase of TCP window size is limited to factors of (1+W/m) and (1+1/m) during slow start and congestion avoidance, respectively (as measured over an RTT). Further, the ACK dropping method of the preferred embodiment requires access to write TCP headers and cannot work under IPSec authentication/ encryption, whereas the other schemes (e.g., Keshav and Balakrishnan et al.) can function under authentication, but not under encryption because they require only read-access to TCP headers. Finally, the ACK dropping method of the preferred embodiment needs to process ACKs both during enqueue and dequeue operations, whereas the methods Keshav and Balakrishnan et al. schemes require ACK processing during only one of these operations.

The burstiness and window increase rate problems can be alleviated using an acknowledgement regeneration/reconstruction (AR) component at the end of the reverse link. The regeneration scheme would regenerate (and optionally smooth out) ACKs suppressed at the ATU-R device. In fact, the regenerator could regenerate more than one ACK per maximum segment size (MSS), which can be quantified as the "regeneration factor" R, all the way up to one ACK for every byte acknowledged. The rate of TCP window increase for a round trip time (RTT) is now modified to a factor of $Min(1+R, 1+W/m)$ during slow start and a factor of $(1+R/W)$ during congestion avoidance, at the cost of $(R-1)*W$ excess ACKs per RTT. Given this huge cost, using a regeneration factor $R \leq 4$ is recommended. Immediately, it should be noted that if the system remains primarily in congestion avoidance, AR would result in m to increase by a factor of $(1+R/W)$ every RTT. If R ($\leq 4$) is much smaller than W, AR has only a small additional impact in compensating for asymmetry. In other words, the ACK dropping method of the preferred embodiment should be viewed as the primary asymmetry compensation technique.

Figure 5:
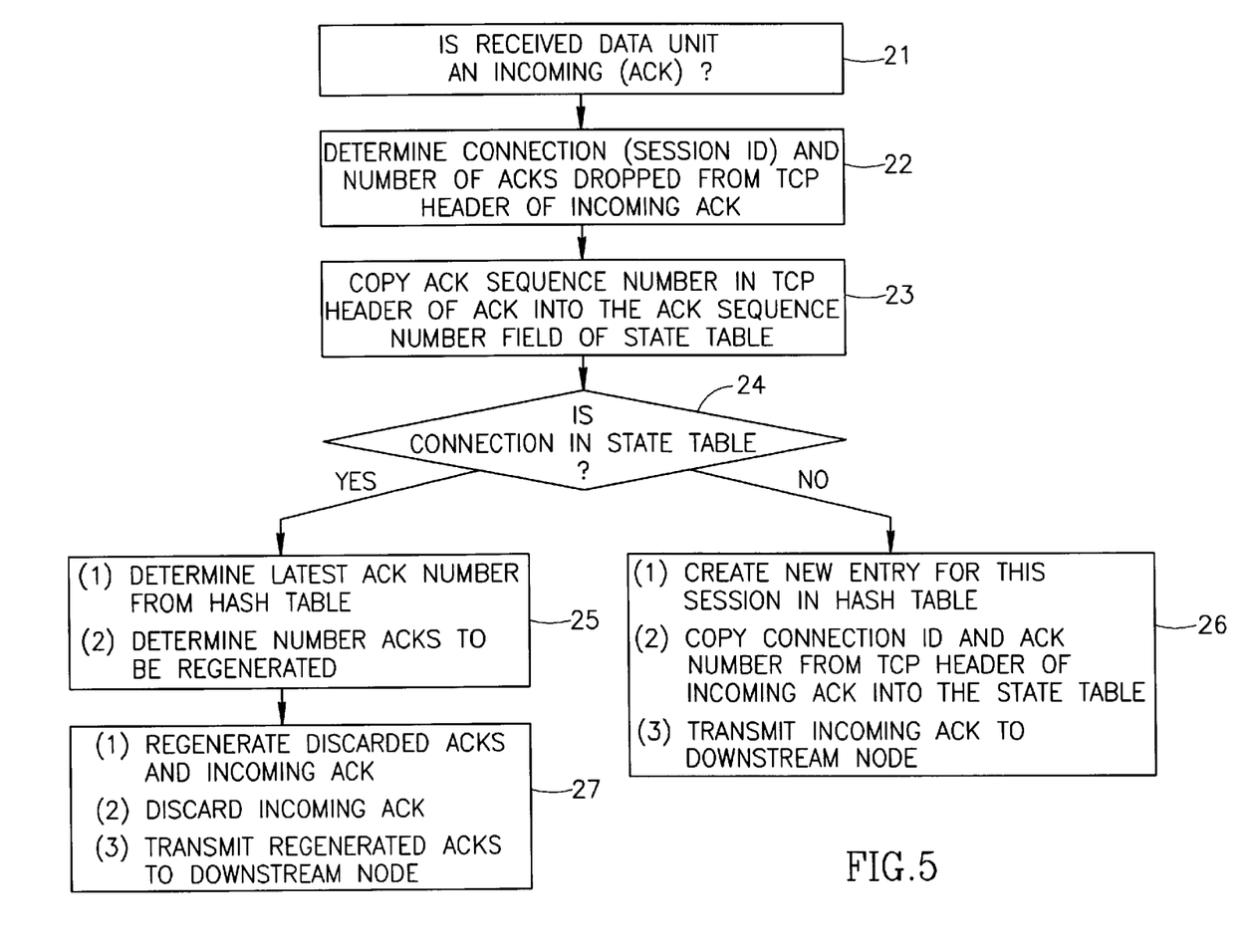
FIG. 5 is a flowchart illustrating an ACK regeneration method in accordance with a preferred embodiment of the present invention.

The ACK regeneration method of the preferred embodiment of the present invention will be described with reference to FIG. 5. When an ACK is received by the ATU-C device 4 via the ADSL link 2, the ATU-C device 4 may regenerate the discarded ACK(s) based on the information contained in the (prior) ACK packet and a per-flow state table maintained at the ATU-C device 4. The per-connection state table at the ATU-C device 4 is similar to that of the ATU-R device 2 except that it comprises a field for storing the latest ACK sequence number in place of the active bit. In particular, if it is determined that a received data unit is an incoming ACK, the ATU-C device 4 decodes the TCP header of the incoming ACK to determine the connection or session ID of the incoming ACK by checking the source port number, the destination port number, the source address and the destination address in the TCP header of the incoming ACK, and the number of ACKs discarded at the ATU-R device 2 (steps 21 and 22). The ACK sequence number in the TCP header of the incoming ACK is copied into the latest ACK sequence number field of the per-connection state table (step 23). If the connection of the incoming ACK is represented in the per-connection state table, then the ATU-C device 4 determines the number of ACKs to be regenerated based on the latest ACK sequence number stored in the state table and the number of ACKs dropped at the ATU-R device 2 stored in the header of the incoming ACK (step 25). The discarded ACKs as well as the incoming ACK are then regenerated and transmitted to the downstream node and the incoming ACK is discarded (step 27). If the connection of the incoming ACK is not represented in the state table, a new entry is created wherein the connection identifier information and ACK sequence number are recorded and the incoming ACK is transmitted to the downstream node (step 26). Further, a regeneration factor is introduced which denotes the number of discarded ACKs regenerated in response to one received ACK.

Simulations have shown that the forward throughput increases with an increase in the regeneration factor but that it reaches a maximum level when the regeneration factor is three. Any further increase in the regeneration factor is not helpful. The case when regeneration factor is one means the number of ACKs dropped are regenerated. The throughput achieved by using ACK regeneration in conjunction with the ACK discarding method of the preferred embodiment differs from the throughput achieved by the ACK discarding method of the preferred embodiment alone because of the difference in the number of ACKs reaching the source. The window available for the source to send the data is more in case of the regeneration, factor −1 then of the ACK discarding preferred embodiment of the present invention.

Although the present invention has been shown and described with respect to preferred embodiment, various changes and modifications within the scope of the invention will readily occur to those skilled in the art.

What is claimed is:

1. A method of communicating acknowledgment packets over an asymmetrical digital subscriber line, comprising:

generating a plurality of acknowledgment packets at a destination node in response to receiving data generated by a source node;

sequentially transmitting said acknowledgment packets from said destination node;

receiving a first one of said acknowledgment packets at a first intermediate node;

storing said first one of said acknowledgment packets in a queue at said first intermediate node;

receiving a second one of said acknowledgment packets at said first intermediate node while said first one of said acknowledgment packets is stored in said queue;

copying information contained in said second one of said acknowledgment packets into a data table at said first intermediate node;

discarding said second one of said acknowledgment packets at said first intermediate node; and copying said information contained in said second one of said acknowledgment packets data from said data table into said first one of said acknowledgment packets and transmitting said first one of said acknowledgment packets from said first intermediate node.

2. The method according to claim 1, further comprising the steps of:

receiving said first one of said acknowledgment packets at a second intermediate node (DSLAM);

regenerating said second one of said acknowledgment packets based on said information copied into said first one of said packets at said second intermediate node; and sequentially transmitting said first one of said acknowledgment packets and said second one of said acknowledgment packets from said second intermediate node to said source node.

3. The method according to claim 1, wherein said information copied into said first one of said acknowledgment packets comprises the number of acknowledgment packets dropped at said first intermediate node and a connection identifier.

4. The method according to claim 2, wherein said regenerating step further comprises generating a new acknowledgment packet which replaces said first one of said acknowledgment packets.

5. A method of communicating acknowledgment packets over an asymmetrical digital subscriber line comprising:

(a) generating and transmitting a first acknowledgment packet from a destination node in response to receiving data generated by a source node;

(b) receiving said first acknowledgment packet at a first intermediate node;

(c) determining whether a second acknowledgment packet previously received from said destination node is presently stored in a queue at said first intermediate node;

(d) storing said first acknowledgment packet in said queue if said second acknowledgment packet is not stored in said queue;

(e) copying information contained in said first acknowledgment packet into a state table and discarding said first acknowledgment packet at said first intermediate node if said second acknowledgment packet is stored in said queue; and (f) copying said information contained in said first acknowledgment packet from said state table into said second acknowledgment packet and transmitting said second acknowledgment packet from said first intermediate node.

6. The method according to claim 5, wherein step (c) further comprises determining connection information regarding a source and a destination of said first acknowledgment packet from a header of said first acknowledgment packet.

7. The method according to claim 6, wherein step (c) further comprises determining whether flag is set in said state table at said first intermediate node, said flag indicating whether a prior acknowledgment packet associated with the same connection is presently stored in said queue awaiting transmission from said first intermediate node.

8. The method according to claim 6, wherein step (d) further comprises copying an ACK sequence number stored in said header of said first acknowledgment into said state table.

9. The method according to claim 4, wherein step (e) further comprises the steps of:

receiving said second acknowledgment packet at a second intermediate node; and regenerating said first acknowledgment packet based on said information copied into said second acknowledgment packet at said second intermediate node.

10. The method according to claim 9, wherein step (e) further comprises the steps of:

generating a third acknowledgment packet which replaces said second acknowledgment packet and discarding said second acknowledgment packet at said second intermediate node;

transmitting said first and third acknowledgment packets from said second intermediate node.

11. The method according to claim 4, wherein in said queue comprises a first-in-first-out (FIFO) buffer memory.

12. A communications apparatus for transmitting data over an asymmetrical communications link, the apparatus comprising:

a source node for generating and transmitting a plurality of data packets;

a first intermediate node for receiving said data packets from said source node and transmitting said data packets over an asymmetrical communications link;

a second intermediate node for receiving said data packets from said first intermediate node and transmitting said data packets, said second intermediate node comprising a queue and a state table; and a destination node for receiving said data packets from said second intermediate node and generating a plurality of acknowledgment packets in response to receiving said data packets transmitted by a source node;

said second intermediate node receiving said acknowledgment packets, storing said acknowledgment packets in said queue and transmitting said acknowledgment packets stored in said queue, wherein each time said second intermediate receives one of said acknowledgement packets, said second intermediate node stores said one of said acknowledgment packets in said queue if a prior one of said acknowledgment packet is not presently stored in said queue, and copies information contained in said one of said acknowledgment packets into said state table and discards said one of said acknowledgment packets if said prior one of said acknowledgment packets is presently stored in said queue.

13. The apparatus according to claim 12, wherein said second intermediate node copies said information contained in said one of said one of said acknowledgment packets from said state table into said prior one of said acknowledgment packets and transmits said prior one of said acknowledgment packets.

14. The apparatus according to claim 13, wherein said first intermediates node receives said acknowledgment packets from said second intermediate node, and regenerates said acknowledgment packets which where discarded by said second intermediate node based on said information copied into said acknowledgment packets from said state table by said second intermediate node.

15. The apparatus according to claim 12, wherein in said queue comprises a first-in-first-out (FIFO) buffer memory.

* * * * *

UNITED STATES PATENT AND TRADEMARK OFFICE
CERTIFICATE OF CORRECTION

PATENT NO.    : 6,424,626 B1
DATED         : July 23, 2002
INVENTOR(S)   : Kidambi et al.

It is certified that error appears in the above-identified patent and that said Letters Patent is hereby corrected as shown below:

<u>Title page,</u>
Please delete as item [73] as Assignee:

"Hubbell Incorporated, Orange, CT (US)"

and insert as item [73] as Assignee:

-- ECI Telecom, Ltd.
      Petach Tikva, ISRAEL --

Signed and Sealed this

Fifteenth Day of April, 2003

JAMES E. ROGAN
*Director of the United States Patent and Trademark Office*